Aug. 28, 1956     H. GELB     2,760,419
ILLUMINATOR

Filed Oct. 30, 1951     6 Sheets-Sheet 1

INVENTOR.
Herbert Gelb
BY
Attorney

Aug. 28, 1956 H. GELB 2,760,419
ILLUMINATOR
Filed Oct. 30, 1951 6 Sheets-Sheet 2

INVENTOR.
Herbert Gelb
BY
Attorney

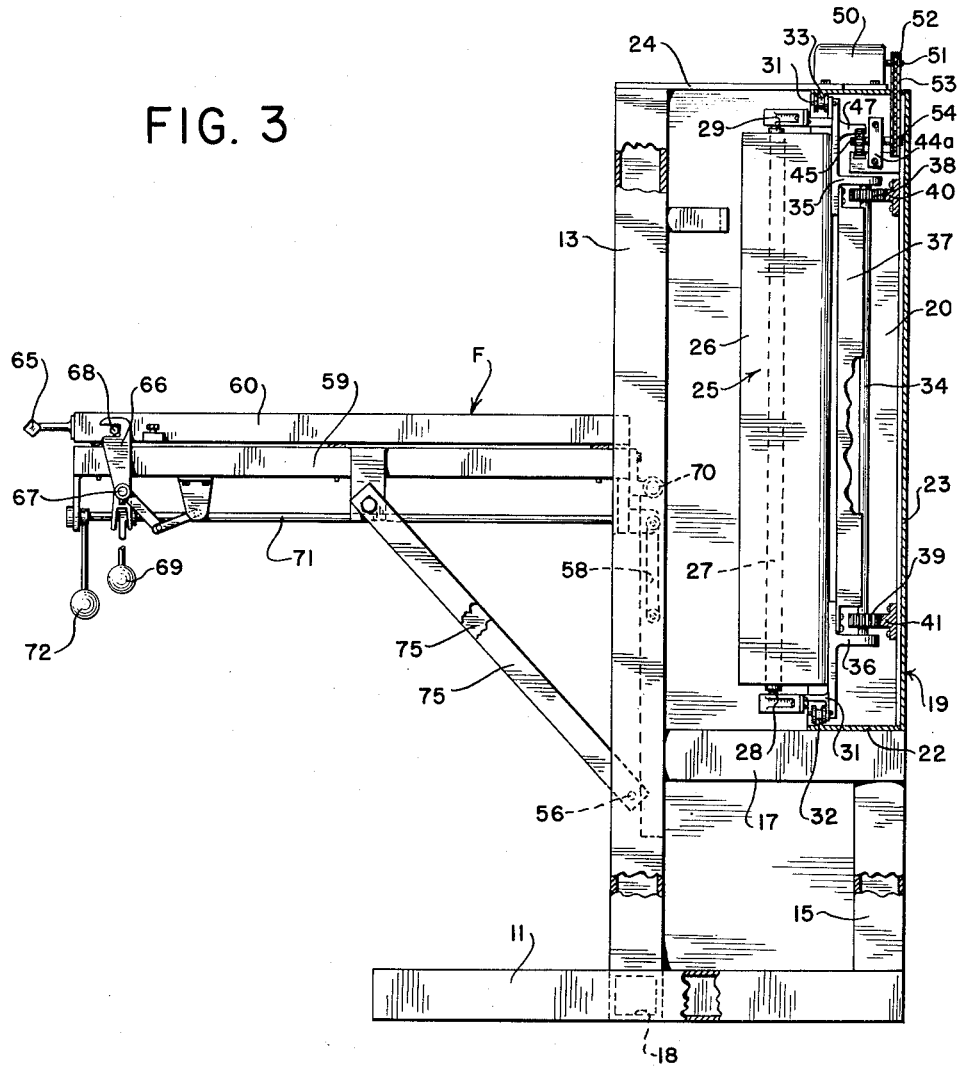

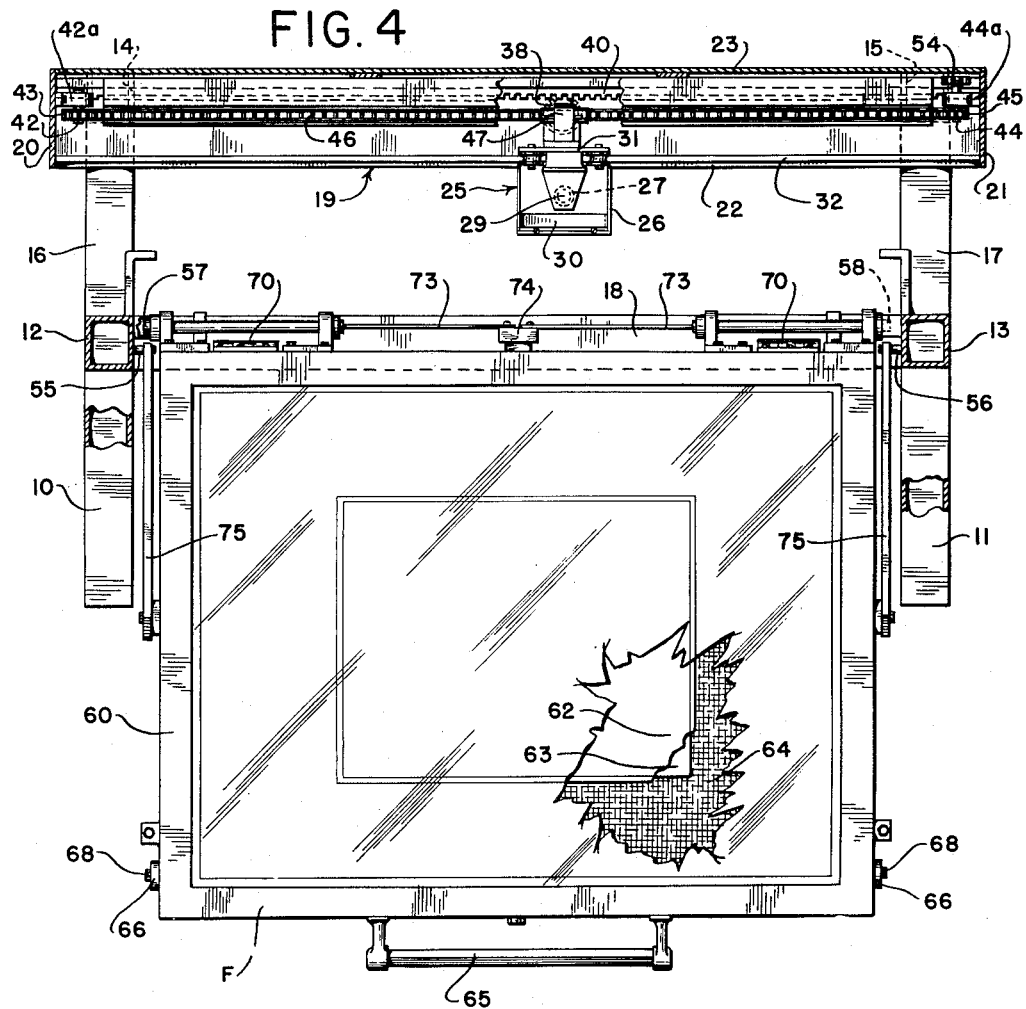
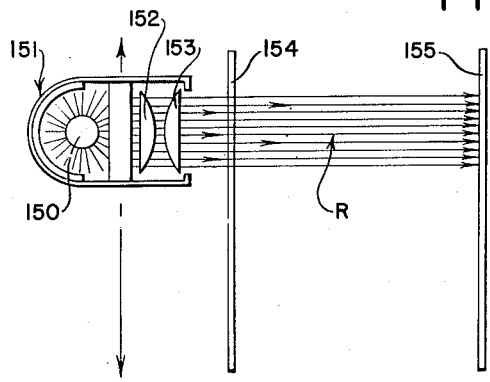

Aug. 28, 1956      H. GELB      2,760,419
ILLUMINATOR
Filed Oct. 30, 1951      6 Sheets-Sheet 5
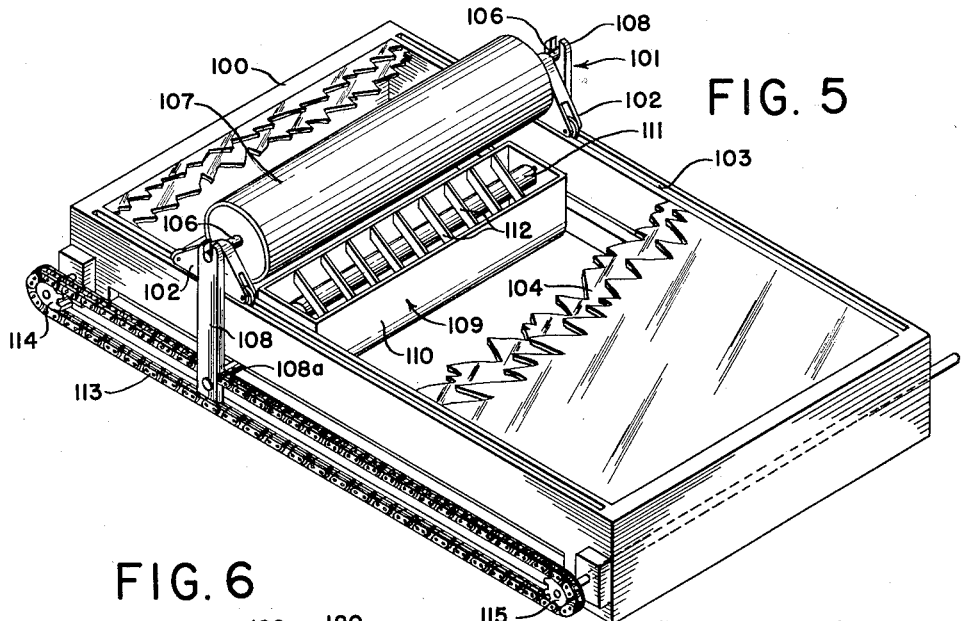
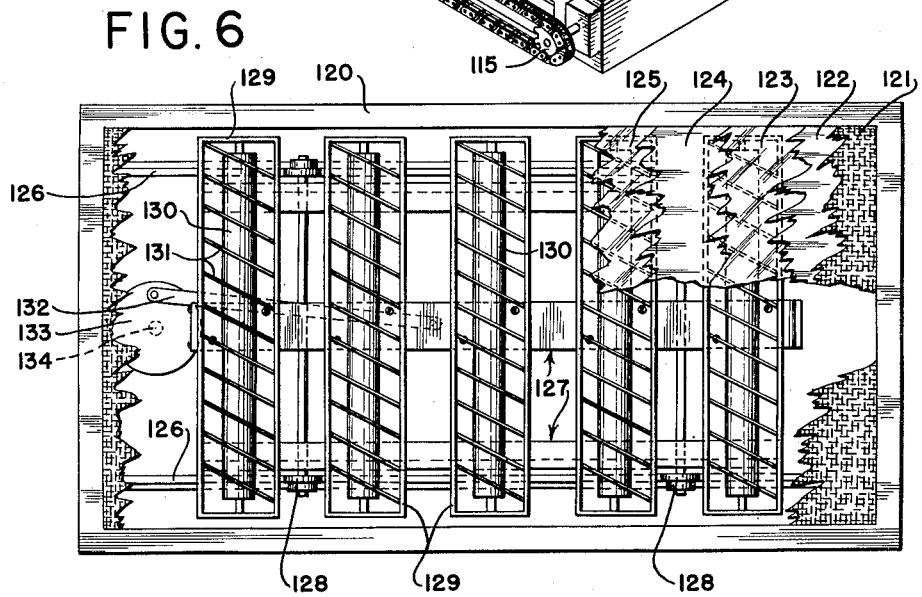
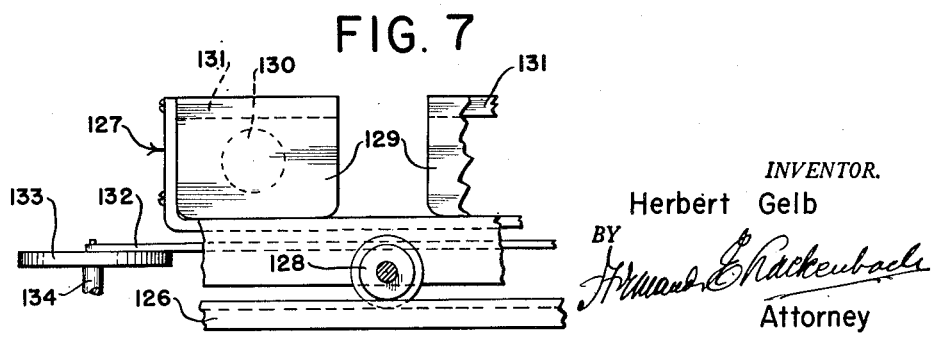
INVENTOR.
Herbert Gelb
BY
Attorney

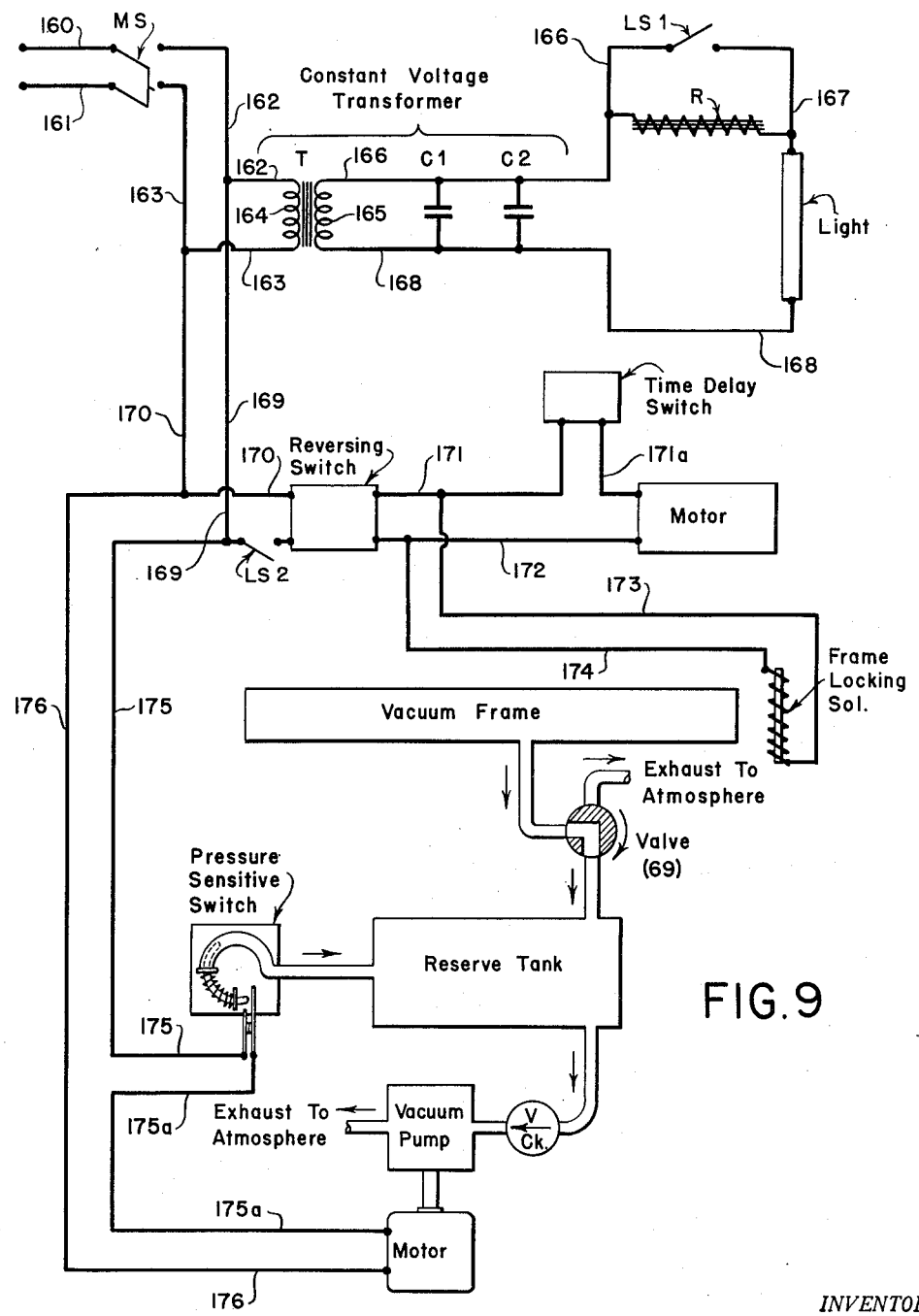

United States Patent Office 2,760,419
Patented Aug. 28, 1956

2,760,419
ILLUMINATOR

Herbert Gelb, New York, N. Y., assignor to Joseph Gelb Company, Newark, N. J.

Application October 30, 1951, Serial No. 253,880
1 Claim. (Cl. 95—76)

This invention relates to photography, and, in particular, to the art of printing light-sensitive material through a transparency.

The general object of the invention is to provide novel and highly efficient apparatus for the precision printing, through a transparency, of light-sensitive material, whereby undercutting and blurring may be substantially eliminated.

A particular feature of the invention is that its embodying apparatus provides a photoprinting light source capable of illuminating a considerable area with rays which are either perpendicular to, or nearly perpendicular to, a transparency and a parallel light-sensitive surface beyond. Ideally, of course, in contact-printing or other printing work involving a transparency, the photographic rays of the light source should be absolutely parallel to each other and at right angles to the transparency and the surface to be printed so that the opaque and transparent pattern of the transparency is precisely reproduced on the sensitized surface without undercutting or blurring. Rays impinging on the transparency at angles substantially less than 90° produce printed areas on the sensitized surface which are more or less staggered with respect to the pattern of the transparency. Where the photographic rays of the light source are unrectified it is plain that a given line upon the transparency is simultaneously printed satisfactorily on the sensitized surface by rays impinging on the transparency at or nearly at 90°, and quite unsatisfactorily, as a blur, on each side of, as well as partly underneath, the line by scattering rays which impinge on the transparency at substantially less than 90°. In platemaking such blurring effects an unfaithful print within the emulsion with which the plate blank is coated; on washing out, preparatory to etching, more or less than the desired amount of metallic surface may be exposed for etching, with the result that the inkable portion of the finished plate representing the line may be took thick or too thin, and, further, may be visibly ragged along the edges. In short, the line printable by the plate in press work will not be a facsimile of the corresponding line upon the transparency.

Where the area of the transparency and the related sensitized surface is quite small—say, several square inches—optical means for rectifying the photographic rays of a light source to produce a bundle of substantially parallel rays are quite practicable and relatively inexpensive. But rectification for paralleling the photographic rays of a light source capable of illuminating an area of several square feet is prohibitively expensive, for it involves the use of a condenser of such great size as to be uneconomical. Heretofore the illumination of large areas, in photoprinting, has been generally accomplished by using reflectors designed so that they tend to bundle the rays of the light source into a very rough approximation of a flood of parallel rays. However, the area to be illuminated is everywhere exposed to rays impinging at various angles off the perpendicular, and precision work has been extremely difficult to achieve where the area involved was in the magnitude of several square feet.

Where a spotlight and reflector are used for illuminating an area of this size it is plain that the central portion of the area is more brilliantly illuminated than the outlying portions. It is an object of the invention to provide apparatus for printing a considerable area of light-sensitive surface through a transparency with true uniformity of exposure over the entire area. With the present apparatus every unit of area of the transparency and the related sensitized surface receives a common exposure, so that the marginal portions of the sensitized surface are photoprinted precisely like the central portion.

Apparatus herein described and illustrated provides means for producing a band of photographic rays all of which are either parallel to, or nearly parallel, to each other, and for producing such a band of considerable length—say, several feet—and of uniform intensity lengthwise, whereby the band may be utilized for printing a sensitized surface having an area of a considerable number of square feet by effecting relative lateral movement between the band and the surface.

Those versed in the art will immediately appreciate the advantage of such a band of photographic rays. With such a source of light, not only may a single large surface be uniformly printed, but a great volume of small work may be printed at one time, by effecting such relative movement between the band and the work.

A further object of the invention is to provide a novel and highly efficient contact-printing frame capable of accommodating a single transparency and sensitized sheet, each of considerable size, or a number of small printing jobs at one time. One form of the invention contemplates a contact-printing frame having, as part thereof, a vacuum pan, said frame being adapted to be disposed horizontally for loading and unloading, and vertically for printing, in which latter position it is swept from side to side by a laterally moving band of photographic rays as described above.

Another object is to provide novel apparatus for contact-printing a sensitized cylindrical surface.

Still another object is to provide means for precision printing, through a transparency, of an enlargement or reduction upon a sensitized surface.

These and other objects and features of the invention will be more fully understood from the following description and from the drawing, in which several embodiments of the invention are shown.

In the drawing:

Figs. 1 through 4, and Fig. 9, relate to a first embodiment of the invention.

Fig. 3 is the section 3—3 of Fig. 1.

Fig. 4 is the section 4—4 of Fig. 1.

Fig. 5 is an isometric perspective view of a second embodiment.

Fig. 6 is a top plan view of a third embodiment.

Fig. 7 is a fragmentary and slightly enlarged side view of the third embodiment, the parts shown being toward the left in Fig. 6. Certain exterior parts of the embodiment are broken away so that parts inside may be clearly seen.

Fig. 8 is a diagram illustrating an employment of the invention for photoprinting a sensitized surface through a transparency where the surface and transparency are distant from each other.

Fig. 9 is a combined electrical and pneumatic diagram relating to the first embodiment of the invention, pictorially illustrated in Figs. 1 through 4.

Figure 1:
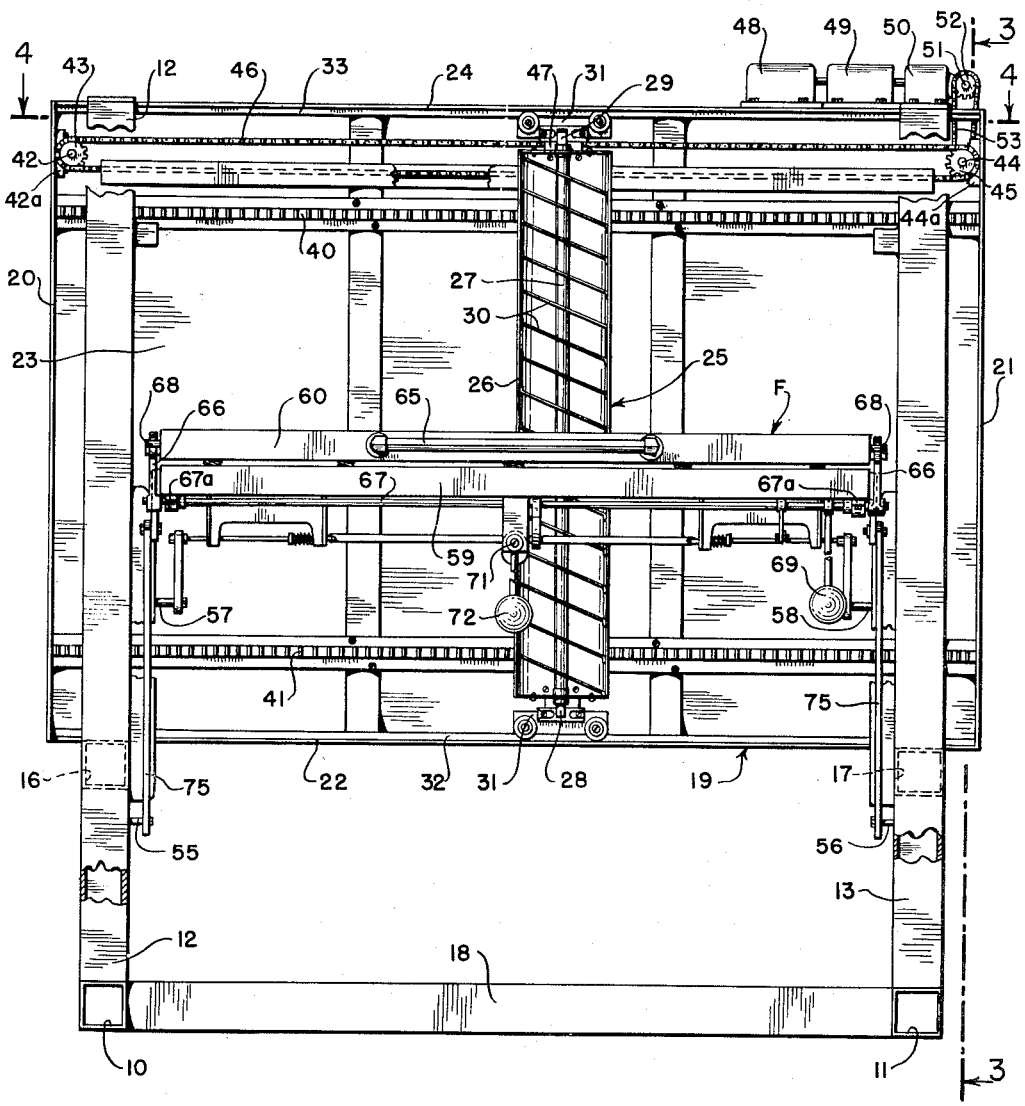
Fig. 1 is a front elevational view of the first embodiment showing the printing frame thereof in horizontal position for loading or unloading.

The invention, as illustrated in Figs. 1 through 4, and in Fig. 9, is embodied in the form of a contact-printing apparatus which may be constructed to handle transparencies and sensitized sheets of great size. Obviously, when built on such scale, the apparatus may be used for mass production of small print jobs. The illustrated apparatus comprises a main frame on which is mounted a vacuum printing frame and a light source. The light source provides a specially interrupted band of photographic rays which are either parallel to each other or nearly so; and means are provided whereby the band may be moved at 90° to its longitudinal axis from side to side of the printing frame, when the latter is in printing position, whereby the frame and its contents are progressively illuminated in a uniform manner. The printing frame is pivotally mounted on the main frame so that the former may be horizontally positioned for easy loading and unloading, and vertically positioned for printing.

The main frame is designated in its entirety 9, and is seen wholly or in part in Figs. 1 through 4. The main frame comprises pedal members 10 and 11, being respectively to the left and to the right in Figs. 1 and 4; frontal uprights 12 and 13, respectively to the left and to the right in Figs. 1 and 4; much shorter uprights 14 and 15, respectively behind uprights 12 and 13 (upright 14 is seen only in Fig. 4, and therein in dotted lines; upright 15 is seen in both Figs. 3 and 4); and horizontal braces 16 and 17, respectively tying together uprights 12 and 14 on the left, and uprights 13 and 15 on the right, as in Fig. 4; and another horizontal brace 18, best seen in Fig. 1, tying together the pedal members 10 and 11. In the structure shown the rear ends of braces 16 and 17 respectively rest upon the tops of uprights 14 and 15 (Fig. 3 shows the arrangement of brace 17, which is similar to that of brace 16, here obscured).

The elements 10 through 18 are preferably of tubular steel stock, and may be of square cross section, as shown. The elements of the main frame are conveniently secured together by welding.

Mounted on the rear of the main frame is a box 19 comprising side panels 20 and 21 (left and right, respectively, in Figs. 1 and 4), a floor 22, a rear panel 23, and a roof 24 (see Figs. 1 through 4). The box 19, the front of which is unwalled, may be constructed of sheet metal elements welded together, and also may be welded, as a unit, to the main frame. It will be noted in Fig. 3, particularly, that the box actually rests upon braces 16 and 17, and that the roof 24 extends forwardly and surmounts the frontal uprights 12 and 13, to which the front edge of the roof 24 is suitably secured.

The band of photographic rays, abovementioned, emanates from a carriage structure designated in its entirety 25, and which is adapted to be moved from side to side of, and within, the box 19, and transversely with respect to the main frame. The carriage structure 25 comprises a housing 26, unwalled at front, the inside of which is highly polished so that it may serve as a reflector; a tubular gaseous arc light 27 disposed vertically within the housing between terminals 28 and 29; a plurality of baffles 30 extending diagonally across the unwalled front portion of the housing and in front of the light; and trucks 31 at the lower and upper ends of the carriage, the lower of which rollably engages a rail 32 secured to the floor 22 of box 19, and the upper of which rollably engages a similar rail 33 secured to the underside of the roof 24 of the box. See Figs. 1, 2, and 3. The two rails provide means for accurately guiding the carriage 25 during its travel from side to side of the box 19 and main frame 9.

The carriage structure, as best seen in Figs. 1 and 3, is elongated vertically. At the rear of the carriage is a vertically disposed shaft 34, journaled in brackets 35 and 36, respectively secured to the upper and the lower portions of the carriage. The carriage structure is rigidly braced by a channel 37 which extends between the brackets 35 and 36, each of which is also rigidly secured to one of the trucks 31. See Fig. 3, particularly. It will be understood that considerable heat is generated by the arc light; and the channel 37 is provided to stiffen the housing 26 against stresses tending to distort it.

Mounted on shaft 34 near bracket 35 is a pinion 38; and also mounted on the shaft near bracket 36 is a like pinion 39. Secured in suitable manner to the front side of the rear panel 23 of box 19 are two racks 40 and 41, both horizontally disposed and extending from side to side of the box, the former being near the roof and the latter near the floor. Racks 30 and 41 are respectively engaged by pinions 38 and 39. The pinions are keyed to shaft 34, and in consequence turn together; thus the carriage is prevented, during its travel, from tilting toward either side of box 19. See Figs. 1 through 4.

Figure 2:
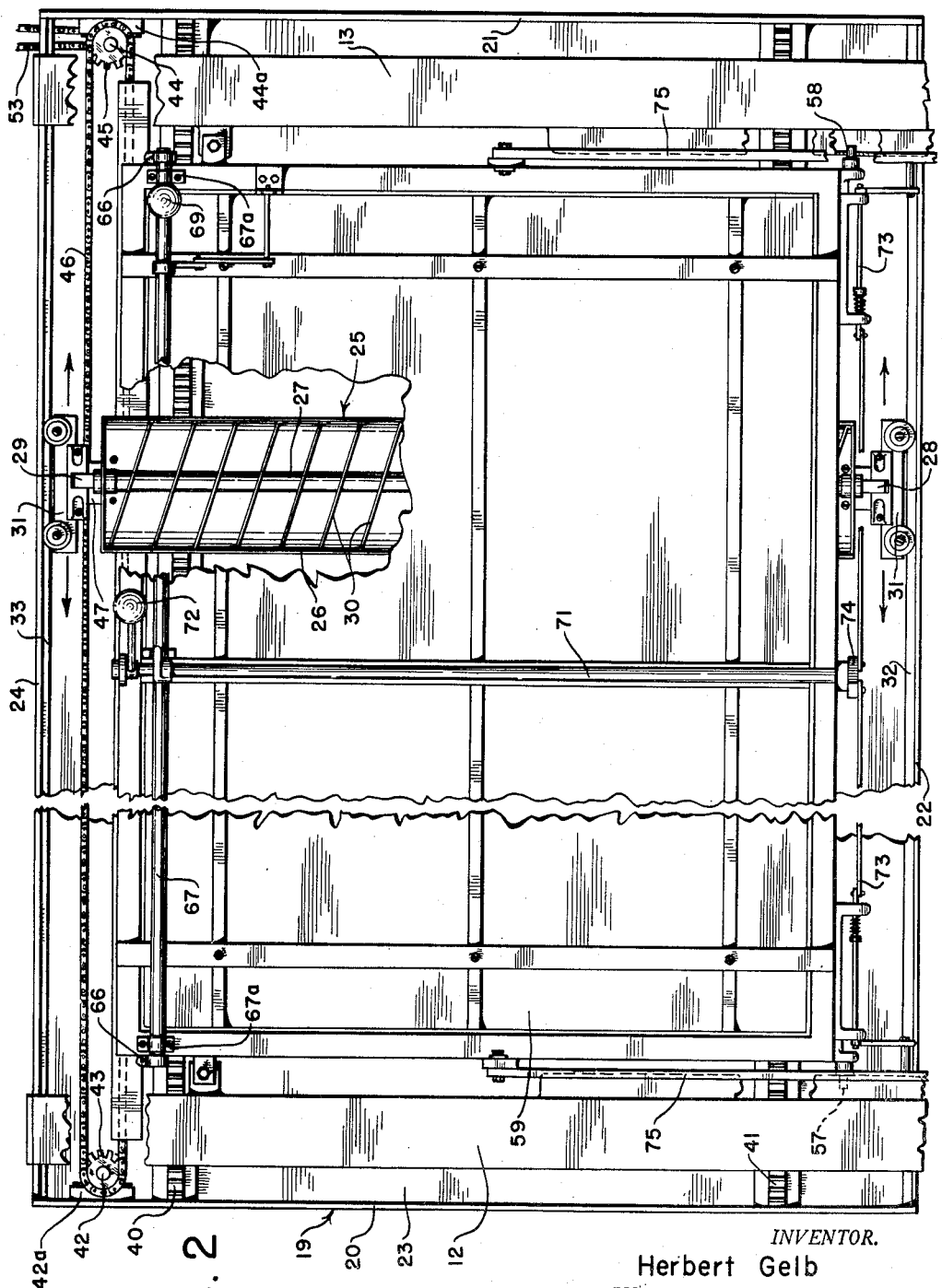
Fig. 2 is an enlarged, fragmentary front elevational view of the same embodiment showing the printing frame thereof in vertical or printing position.

On a stub shaft 42 supported by a bracket 42a secured to the upper portion of side panel 20 within box 19 is a sprocket 43; and on a like stub shaft 44 supported by a bracket 44a secured to the upper portion of side panel 21 within the box is a like sprocket 45. The sprockets are positioned on a common level within the box, as best shown in Figs. 1 and 2, and are joined by a chain 46. The chain, in the form of a loop, as seen in Fig. 1, is attached to a bracket 47 secured to the rear upper portion of the carriage 25 (see, particularly, Figs. 3 and 4).

Mounted on top of the roof 24 of box 19, to the right as seen in Fig. 1, is a motor 48, a reducer 49, a direction changer 50 having a drive shaft 51, and a sprocket 52 mounted on said drive shaft. A chain 53 connects sprocket 52 with another sprocket 54 mounted within box 19 on stub shaft 44, on which is also mounted sprocket 45, mentioned above. Thus the motor 48 serves to actuate sprocket 45, which in turn drives chain 46 thereby causing the carriage 25 to move sidewise in box 19. See also, Figs. 3 and 4.

It will be understood that motor 48 must necessarily be reversible in the structure shown. Also suitable limit switches, not shown in the pictorial Figures 1 through 4, are provided at either side of the box 19 to insure de-energization of the motor when the carriage 25 reaches one of certain stations of position with respect to the sides of the box, and, obviously, such switches may conveniently be operated on contact by the carriage itself or some part thereof. An exemplary electrical arrangement for this present embodiment is described more particularly below, and is illustrated in Fig. 9.

Pivotally mounted at 55 and 56, respectively studs on uprights 12 and 13, and pivotally and slidably mounted at 57 and 58, respectively slots provided in angles secured to uprights 12 and 13, is a printing frame designated in its entirety F. The printing frame comprises a vacuum pan 59 having a cover member 60 adapted to seal the pan hermetically. In usual manner the cover member is fenestrated, the fenestration being covered by a sheet of glass (Fig. 4); and the cover member is hingedly attached to the pan.

The printing frame F is adapted to be disposed horizontally for loading and unloading, as shown in Figs. 1, 3, and 4; and vertically for printing, as shown in Fig. 2.

In Fig. 4, a plan view showing the printing frame F in horizontal position, the sheet of glass is broken away in part; and beneath are seen, superposed, a transparency 62 and a sheet of sensitized material 63, these lying on a diaphragm 64, this latter being preferably a sheet of rubber having a corrugated upper surface, as indicated. The diaphragm 64 constitutes a hermetic seal for the bottom of the vacuum pan; the diaphragm is rigidly fixed to the pan around its periphery, but the rest of the diaphragm is free to move up and down in response to atmospheric conditions within the printing frame. When the frame is sealed and exhausted the diaphragm resiliently bellies against the load within the frame and presses the load (i. e., one or more transparencies and sensitized sheets) flat against the underside of the glass sheet of the cover member 60.

A handle 65 is provided on one edge of the cover member 60 (Figs. 1, 3, and 4). The handle may be employed for raising and lowering the cover member alone when the latter is not locked in position on the vacuum pan;

and also may be used for raising and lowering the entire printing frame when the latter is sealed.

On either side of the vacuum pan is a latch 66. Each latch, both of which are alike, is keyed to a shaft 67 which extends across the printing frame and is journaled in pillow blocks 67a, or the like, best shown in Fig. 2. On either side of the cover member is a pin 68 (Figs. 1 and 4; but see, particularly, Fig. 3, where latch and pin arrangement is best illustrated). Each pin 68 is adapted to be engaged by one of said latches. A handle 69 is provided for rotating shaft 67 whereby latches 66 may be brought out of engagement with pins 68. The handle 69 may be adapted to control atmospheric conditions within the printing frame (see below, and Fig. 9).

The cover member 60 is hingedly attached to the vacuum pan in any suitable manner, as at 70 in Fig. 3. When the printing frame is raised to vertical or printing position, as shown in Fig. 2, it is desirable to lock it temporarily in such position to avoid any accidental swinging of the frame away from the illuminator during an exposure. A means for so locking the printing frame in vertical or printing position comprises a shaft 71 journaled on the outside of the vacuum pan 59 and disposed normally to shaft 67, abovedescribed; a handle 72 for rotating the shaft 71; and a pair of spring controlled latches 73, each being pivotally connected to a member 74 keyed on shaft 71 whereby rotation of said shaft effects retraction of said latches, and each being adapted to enter a suitable aperture, not shown, in one of the uprights 12 and 13 when the printing frame is in vertical or printing position. See, particularly, Fig. 2; also Figs. 1, 3, and 4.

Braces 75, forming that part of the printing frame which is pivotally mounted on the main frame at 55 and 56, serve to prevent collapse of the printing frame when it is disposed horizontally for loading and unloading.

It will be readily understood from the foregoing that the embodiment of the invention described above is an apparatus comprising a vacuum printing frame adapted to be lowered into horizontal position for loading and unloading, and to be raised into vertical position for printing, and a vertically disposed linear light source adapted to travel normal to its axis in a plane parallel to that of the printing frame when the latter is in vertical position. Obviously, so long as the relative positions of the printing frame and traveling linear light source are not disturbed during an exposure, it is immaterial that the printing position of the frame and light be vertical, for the invention may readily, if perhaps less conveniently, be embodied in apparatus wherein the printing position is horizontal or otherwise.

Refinements relating to the above described embodiment of the invention are subsequently discussed.

Fig. 5 shows, in perspective, another form of apparatus embodying the invention. Here the apparatus is adapted to print, through a transparency, a cylindrical sensitized surface, as, for example, where a plate is desired to be made directly upon the cylindrical surface of a blank printing roller. On a frame 100 is mounted a carriage designated in its entirety 101. The carriage comprises wheeled trucks 102 adapted to roll in guides 103 provided on the top of each of two opposite sides of the frame 100. Mounted within the frame and at the top part thereof is a sheet of glass 104 on which a transparency 105 may lie as shown. The trucks 102 are joined together laterally with respect to the frame 100 by means of a shaft 106 on which is mounted a cylinder or printing roller blank 107, the cylindrical surface being assumed to have a light-sensitive coating. The trucks are preferably notched at the top whereby the shaft and cylinder may be removed from the frame without necessitating removal also of the trucks. Suspended from trucks 102 by means of suitable hangers 108 on each side of the frame is a light source 109, generally similar to that previously described. The housing or reflector is designated 110, a tubular gaseous arc 111. Suitable electrical connections, not shown, may be provided in usual manner. Lugs 108a at each end of the light source pass through slots in opposite walls of the frame and engage the hangers 108. Only one lug 108a may be seen, the other being obscured by the frame. A chain loop 113, mounted on sprockets 114 and 115 which are journaled at opposite ends of the frame, is secured to one of the hangers 108. Rotation of one of the sprockets, e. g., 115, effects movement of the light source at 90° to its axis and longitudinally with respect to the frame; also, such rotation moves simultaneously the carriage and the cylinder, the latter rolling on the transparency and the glass sheet. Thus while the transparency remains fixed with relationship to the frame, the light source and the cylinder move together on opposite sides of the transparency, the rotating cylinder sequentially presenting new surface for exposure to the light source as the operation continues from one end of the frame to the other.

Figs. 6 and 7 illustrate another form of apparatus embodying the invention. Herein a frame 120 is preferably disposed horizontally, Fig. 6 being a top plan view thereof. The frame is assumed to be covered by a vacuum frame, here inverted. A diaphragm 121, preferably of rubber having a corrugated surface for engagement by a sheet of sensitized material 122, is peripherally fixed to the frame 120 but the rest of the diaphragm may resiliently move in accordance with atmospheric conditions inside the vacuum frame. A transparency is designated 123, a filter 124, and a sheet of glass, constituting the bottom wall of the vacuum pan, 125. Plainly the vacuum frame structure may be a separate unit pivotally mounted on the frame 120 whereby the vacuum frame may be swung, say, 180° for loading and unloading. Within the frame 120 beneath the vacuum frame are two rails 126, extending from end to end of the frame 120. Rollably mounted on the rails is a carriage 127, the wheels of the carriage being designated 128. Mounted on the carriage are a plurality of light sources of the class previously described, all being parallel to each other and separated each from the other by a distance slightly less than the width of any source, as shown. The housings or reflectors of the light sources are designated 129, the tubular gaseous arcs 130, and the baffles 131. A connecting rod 132 is pivotally attached both to the carriage 127 and to a disk 133 which is mounted on a shaft 134 suitably journaled in one end of the frame 120. The connecting rod 132 is eccentrically attached to disk 133 so that upon rotation of shaft 134 by any suitable means the carriage 127, together with its light sources, is reciprocated back and forth within the frame 120. In this manner all parts of the transparency and sensitized material are uniformly illuminated.

Fig. 8 shows, diagrammatically, a modification of the invention. An elongated gaseous arc light is designated 150, its housing and reflector 151, baffles (only one of which may be seen) 152, and linear condensers 153. Fig. 8 is an end view, and hence only the nearest baffle may be seen, but it will be understood that the light source structure is similar to that first described, except that linear condensers are mounted between the baffles and the transparency, which is designated 154. The sheet of sensitized material is designated 155, and rays from the light source employed in photography R. It will be noted here that the sensitized surface is distant from the transparency. The rays, at a convenient station between the transparency and the sensitized surface, may be expanded or contracted, as desired, for the purpose of producing a print of scale different than that of the transparency.

Fig. 9 shows, diagrammatically, an electrical and pneumatic arrangement suited for the embodiment of the invention first described above, and illustrated pictorially in Figs. 1 through 4.

Herein 160 and 161 represent a house line. MS is a main switch. Lines 162 and 163, connected to the main switch, are joined through primary 164 of a constant voltage transformer T, the secondary of which is designated 165. Line 166 leads from one terminal of the secondary 165 to a limit switch LS1, from which line 167 leads to one terminal of the elongated gaseous arc light, such as 27, Fig. 1. The other terminal of the arc light (labeled in Fig. 9) is connected by line 168 with the other terminal of secondary 165. C1 and C2 are the usual condensers. It will be noted that limit switch LS1 is bypassed by resistance R, bridging lines 166 and 167.

When the carriage, such as 25, is at either of the two sides of the box 19, and therefore slightly beyond the printing frame, a limit switch such as LS1 may be actuated in any suitable manner to open in response to the presence of the carriage, whereupon the light will be dimmed, as its energy then will be received solely through the resistance. As soon as the carriage begins to move away from a side of the box 19 the limit switch closes, and the light regains the intensity required for photographic purposes. This arrangement is to prevent excessive use of current when the light is not employed in printing and also to avoid having to shut the light down altogether and then wait until it assumes proper brilliancy for a next run of the carriage.

Line 169, connected to line 162, leads to another limit switch LS2, and to one side of a reversing switch (labeled). Line 170, connected to line 163, leads directly to that side of the reversing switch. Line 171 leads from the other side of the reversing switch to a time delay switch (labeled), from which line 171a leads to the motor 48 (labeled, Fig. 9). From the motor line 172 returns to the reversing switch.

A limit switch such as LS2 may be provided at either side of the box 19 and may be arranged to control the reversing switch so that in the presence of the carriage 25 at one side of the box the motor is reversed to drive the carriage to the other side of the box. The time delay switch is provided so that the carriage is not abruptly reversed in its travel.

It is highly desirable that the printing frame be locked in printing position while the light is traveling from side to side of the box so as to avoid accidental movement of the frame and consequent spoilage of the print or prints being made. One manually controllable means for locking the printing frame in printing position has been previously described. As a safety measure the locking means may be controlled by a solenoid instead of by hand—any suitable structure being used. None is shown, since the use of a solenoid as a substitute for the hand in a variety of devices is well known; but a solenoid (labeled) is indicated in Fig. 9, and may be utilized to control the locking mechanism of the frame. The solenoid is connected in parallel with the motor line: line 173 connects with line 171 and with one terminal of the solenoid; line 174 connects with line 172 and with the other terminal. Thus when the motor is energized, and the light is traveling from side to side of the box 19, and across the printing frame, the latter presumably then in printing position, the solenoid is also energized. The solenoid may be utilized in such manner that when its core is in retracted position the printing frame cannot be moved from printing position.

Line 175, connected to line 169, leads to a pressure-sensitive switch (labeled); and line 175a leads therefrom to another motor arranged to drive a vacuum pump (both labeled; see the lower part of Fig. 9). Line 176 returns from the vacuum pump motor to line 170. The pressure-sensitive switch is arranged so that it is normally closed. Thus, closing the main switch MS operates to start the vacuum pump motor. The pressure-sensitive switch is provided for controlling the vacuum pump motor in response to atmospheric conditions in the vacuum pan, as will be described below.

The vacuum frame (labeled) is connected through a valve (labeled) with a reserve tank (labeled) the latter being connected through a check valve (symbol) with the vacuum pump. The vacuum pump is provided in usual manner with an exhaust to atmosphere. The valve, shown on Fig. 9, may be arranged in suitable manner to be actuated by handle 69 (see above), which is provided for rotating shaft 67 whereby latches 66 may be brought out of engagement with pins 68 for the purpose of unlocking the cover member 60 of the vacuum frame. When the cover member 60 is locked in closed position on the vacuum pan, the valve permits communication between the vacuum frame and the reserve tanks and vacuum pump, as shown in Fig. 9. When the cover member is unlocked, as by manipulation of handle 69, the valve permits communication between the vacuum frame and atmosphere, whereupon air flows into the frame, permitting the cover member 60 to be raised and material within the frame to be removed. The reserve tank is provided only as a convenience in large installations subject to heavy duty. The pressure-sensitive switch is connected with the reserve tank directly in the diagram of Fig. 9; it may, of course, be dispensed with altogether if no reserve tank is involved. When pressure within the reserve tank rises to a certain amount the pressure-sensitive switch closes and starts the vacuum pump motor, whereupon pressure within the tank is diminished.

Where the area of a contact print or other print made through a transparency is relatively small, such as a panel of motion picture film, attainment of a bundle of photographic rays all very nearly parallel to each other, presents no problem. A spot source of light, such as an arc between two carbon electrodes within a truly parabolic reflector, will give a nearly perfect bundle, if the transparency and sensitized material are fairly close to the mouth of the reflector. The art also shows a means of attaining the ideal bundle of photographic rays from a relatively short incandescent filament, having a reflector behind it and a linear condenser interposed between the filament and the transparency. This means was primarily intended for the contact printing of motion picture filament panels; and of course the print is made by effecting relative movement between the linear source of light as a unit and the transparency (negative) and the sensitized material (positive) as another unit, the movement being normal to the axis of the light source and transverse with respect to the transparency. It is plain, however, that it is extremely difficult to provide an incandescent linear filament of any great length; and these means, so well adapted for printing motion picture films, are wholly inadequate for use where the contact or other print, involving a transparency, is of great area—say, several square feet.

The present invention has as its principal purpose the provision of means for the precision printing of large areas of sensitized material. Precision printing will be understood to mean that all parts of the area of a large sensitized surface are exposed in a common manner. So far as is known, the present invention provides the first means for uniformly exposing a considerable number of square feet of area of sensitized material with exactitude comparable to that obtaining in the printing of the small panels of motion picture films.

Effecting relative movement between the linear light source as a unit and the transparency and a sheet of sensitized material as another unit, with the movement normal to the axis of the source and transverse with respect to the last named unit, is old. Here, however, is the principal objection to this system where no means are provided for rectifying the photographic rays of the source: Even if it be assumed that the linear light source, e. g. an elongated gaseous arc light, is provided with an elongated reflector, the cross-section of which is a parabola, it will be readily understood that while theoretically all rays of the source which are normal to the axis thereof are reflected in parallelism and may impinge perpendicularly upon a transparency, all other rays impinge upon the transparency at angles less than 90°, causing more or less blurring and under-cutting. Indeed, since the source is emitting rays universally, some rays—either direct or reflected—strike the transparency at angles even less than 45°, all slanting rays cause some blurring and the blurring and undercutting increases as the angle decreases.

It has been suggested in the art that baffles be provided at the mouth of the reflector containing a linear light source for the purpose of masking some rays which are more parallel to the axis of the source than normal thereto. However, such baffles, as has been shown in the prior art, were disposed at 90° to the longitudinal axis of the source. The effect of relative movement between the source and the transparency, said movement being normal to the axis of the source, and transverse with respect to the transparency, is that the pattern of illumination of the transparency comprises a number of bands representing the tracks of photographic rays, such bands being separated by a shadow line representing the tracks of the baffles. A construction of this character masks certain undesirable slanting rays at the expense of streaking the print. The form shown in the drawing comprises a series of diagonal baffles, all parallel to each other, and preferably evenly spaced, mounted across the mouth of the reflector. It will be readily seen in Figs. 1 and 2 that the lower end of any baffle is on a level with the upper end of an adjacent baffle. The presence of the baffles at the front of the reflector in the present structure cuts the light from the elongated arc, so that the photographic rays constitute an interrupted bond of light comprising a series of parallelogrammatic bundles. When the above described relative movement between the light source and the transparency takes place, the pattern of illumination of the transparency is a plurality of parallel overlapping bands. For this reason, every part of the sensitized surface is exposed to a common amount of light, and any shadow track previously projected onto the transparency and sensitized material, is subsequently illuminated as the movement continues, so that in the end product no streaks indicative of differential illumination appear on the print.

Herein the gist of the baffle arrangement, in connection with the elongated light source, and the reflector, is that a series of baffles are interposed between said source and said transparency for masking certain rays of said source, the directions of which are nearer parallelism with the axis of said source than perpendicularity with said transparency, said baffles being disposed so as to partition rays of said source passing therethrough into bundles the paths of which overlap in the presence of relative movement between said source and said baffles, as a unit, and said transparency, said movement being normal with respect to the axis of said source and transverse with respect to said transparency, whereby the effect of the relative movement between the light source and the baffles, as a unit, and the transparency and the sensitized material as another unit, is that every part of the area of the sensitized material is traversed both by the shadow line or lines of one or more baffles and also one or more projections of bundles or light comprising the interrupted band. In consequence, every unit of area of the sensitized surface, is illuminated in precisely the same way, any other unit thereof of equal area.

Time is saved in utilizing the present apparatus if the vacuum pan is arranged so that contact between the glass of the cover and the resilient bottom of the pan is made automatically upon the closing of the cover. Such sensitized sheets and transparencies as may be supported by the bottom of the pan are therefore immediately pressed firmly against the glass, and but little exhaustion of the atmosphere is required to prepare the frame for printing. As a modification of the invention, the resilient bottom of the pan may be provided on its bottom side with a plurality of springs adapted normally to hold the bottom in an advanced position so that the act of closing the cover actually depresses the bottom slightly. Preferably the resilient bottom member is a rubber mat having a peripheral ridge. In closing the cover the glass initially contacts the ridge, which act creates the seal; as the cover is further moved into lockable position the peripheral portion of the mat is depressed against some of the plurality of springs so that the central portion of the mat presently contacts the glass. After the cover is locked, exhaustion of the atmosphere brings the central portion of the mat firmly against the glass, thereby pressing sensitized sheets and transparencies into intimate contact for printing.

In Fig. 9 a particular arrangement is shown for the operation and control of the vacuum pan, and this arrangement includes a reserve tank. It will be understood, of course, that the valve arrangement illustrated and the reserve tank may both be dispensed with; and that the pump may be utilized to keep the pan exhausted while in use, and that as soon as the pump is cut off atmosphere may leak back into the pan through the pump itself.

Various valve arrangements are usable in connection with the invention. Preferably one or more filters are employed with any valve arrangement.

I claim:

Apparatus for contact printing light sensitive material through a transparency which comprises a main frame; a printing frame for holding said material and said transparency in contact, said printing frame being pivotally mounted on said main frame for vertical and horizontal positioning respectively for printing and for loading and unloading; a vertically disposed linear light source rollably mounted on said main frame for movement from side to side thereof, said light source being partly shielded by an elongated reflector directing its rays toward said printing frame; a series of baffles mounted on said reflector, said baffles being so disposed as to partition rays of said light source into bundles, with each of said baffles being a sheet of opaque material of relatively minute thickness and of relatively great width for blocking certain slanting rays of said light source and with the plane of each baffle being at an angle other than normal with respect to said light source; and means for moving said light source from side to side of said main frame, said means comprising a motor and a variable speed control therefor; a chain loop connected to said light source and mounted on sprockets at each side of said main frame, said motor driving one of said sprockets; a reversing switch for said motor, and a limit switch at each side of said main frame for stopping said motor when said light source arrives at either side of said main frame; and including racks extending from side to side of said main frame at the top and the bottom thereof, and pinions mounted on said source and engaging said racks for maintaining said light source in vertical alignment as it is moved from side to side of said main frame.

References Cited in the file of this patent

UNITED STATES PATENTS

| | | |
|---|---|---|
| 1,246,974 | Marquis | Nov. 20, 1917 |
| 1,800,049 | Bizot | Apr. 7, 1931 |
| 2,153,186 | Henderson | Apr. 4, 1939 |
| 2,374,469 | Wekeman | Apr. 24, 1945 |
| 2,427,923 | Reynolds | Sept. 23, 1947 |
| 2,494,282 | Campbell | Jan. 10, 1950 |
| 2,534,784 | Maxwell | Dec. 19, 1950 |
| 2,534,794 | Powers | Dec. 19, 1950 |

FOREIGN PATENTS

| | | |
|---|---|---|
| 373,107 | Great Britain | Nov. 13, 1930 |